(12) United States Patent
Wilson et al.

(10) Patent No.: US 7,986,249 B2
(45) Date of Patent: Jul. 26, 2011

(54) SYSTEM AND METHOD FOR DISPLAYING GRAPHICAL DEPARTURE PROCEDURES

(75) Inventors: Blake Wilson, Peoria, AZ (US); Roger W. Burgin, Scottsdale, AZ (US); Aaron Gannon, Anthem, AZ (US); Dave Pepitone, Sun City West, AZ (US)

(73) Assignee: Honeywell International Inc., Morristown, NJ (US)

( * ) Notice: Subject to any disclaimer, the term of this patent is extended or adjusted under 35 U.S.C. 154(b) by 276 days.

(21) Appl. No.: 12/276,999

(22) Filed: Nov. 24, 2008

(65) Prior Publication Data

US 2010/0127895 A1    May 27, 2010

(51) Int. Cl.
*G01C 21/00* (2006.01)
(52) U.S. Cl. ... 340/972; 340/951; 340/961; 340/995.24; 701/300; 701/301
(58) Field of Classification Search .................. 340/972, 340/951, 995.24, 961; 348/117; 701/300–301
See application file for complete search history.

(56) References Cited

U.S. PATENT DOCUMENTS

| | | | | |
|---|---|---|---|---|
| 4,831,538 A * | 5/1989 | Cucchiari et al. | ............ | 701/200 |
| 5,047,942 A * | 9/1991 | Middleton et al. | ............. | 701/15 |
| 5,268,698 A * | 12/1993 | Smith et al. | .................... | 342/450 |
| 5,331,330 A * | 7/1994 | Susnjara | ....................... | 342/460 |
| 5,448,233 A * | 9/1995 | Saban et al. | ................. | 340/963 |
| 5,454,074 A * | 9/1995 | Hartel et al. | .................... | 715/710 |
| 5,493,309 A * | 2/1996 | Bjornholt | ....................... | 342/455 |
| 5,519,618 A * | 5/1996 | Kastner et al. | ................ | 701/120 |
| 5,695,157 A * | 12/1997 | Coirier et al. | ................. | 244/183 |
| 5,740,047 A * | 4/1998 | Pilley et al. | .................... | 701/120 |
| 6,023,278 A * | 2/2000 | Margolin | ....................... | 345/419 |
| 6,038,498 A * | 3/2000 | Briffe et al. | ....................... | 701/3 |
| 6,160,497 A * | 12/2000 | Clark | ............................ | 340/961 |
| 6,199,008 B1 * | 3/2001 | Aratow et al. | ................ | 701/120 |
| 6,246,342 B1 * | 6/2001 | Vandevoorde et al. | ........ | 340/961 |
| 6,253,150 B1 * | 6/2001 | Nakamura | ..................... | 701/208 |
| 6,282,487 B1 * | 8/2001 | Shiomi et al. | ................. | 701/120 |
| 6,289,277 B1 * | 9/2001 | Feyereisen et al. | ........... | 701/202 |
| 6,311,108 B1 * | 10/2001 | Ammar et al. | ................... | 701/16 |
| 6,314,370 B1 * | 11/2001 | Curtright | ...................... | 701/213 |
| 6,317,690 B1 * | 11/2001 | Gia | ................................ | 701/301 |
| 6,320,579 B1 * | 11/2001 | Snyder et al. | ................. | 345/419 |
| 6,348,877 B1 * | 2/2002 | Berstis et al. | ................. | 340/980 |
| 6,356,837 B1 * | 3/2002 | Yokota et al. | ................. | 701/208 |
| 6,473,003 B2 * | 10/2002 | Horvath et al. | ............... | 340/945 |
| 6,477,449 B1 * | 11/2002 | Conner et al. | ..................... | 701/4 |
| 6,571,166 B1 * | 5/2003 | Johnson et al. | ............... | 701/120 |
| 6,591,171 B1 * | 7/2003 | Ammar et al. | .................. | 701/16 |
| 6,600,992 B2 * | 7/2003 | Dow | ............................. | 701/207 |
| 6,617,997 B2 * | 9/2003 | Ybarra et al. | ................... | 342/29 |
| 6,683,541 B2 * | 1/2004 | Staggs et al. | .................. | 340/961 |
| 6,690,299 B1 * | 2/2004 | Suiter | .......................... | 340/973 |
| 6,694,249 B1 * | 2/2004 | Anderson et al. | ............. | 701/120 |
| 6,731,226 B2 * | 5/2004 | Walter | .......................... | 340/972 |

(Continued)

*Primary Examiner* — Benjamin C Lee
*Assistant Examiner* — Quang Pham
(74) *Attorney, Agent, or Firm* — Ingrassia Fisher & Lorenz

(57) ABSTRACT

A method of visually presenting aviation obstacles to an operator of an aircraft is disclosed. The method comprises receiving departure information associated with a runway having a departure end, parsing the departure information to determine a presence of an obstacle associated with the runway, determining a location of the obstacle relative to the departure end of the runway, and displaying a graphical representation of the runway and a graphical representation of the obstacle in the location relative to the departure end of the runway.

20 Claims, 3 Drawing Sheets

U.S. PATENT DOCUMENTS

| | | | |
|---|---|---|---|
| 6,748,325 B1 * | 6/2004 | Fujisaki | 701/301 |
| 6,751,545 B2 * | 6/2004 | Walter | 701/120 |
| 6,845,321 B1 * | 1/2005 | Kerns | 701/209 |
| 6,862,519 B2 * | 3/2005 | Walter | 701/120 |
| 6,920,390 B2 * | 7/2005 | Mallet et al. | 701/120 |
| 6,952,632 B2 * | 10/2005 | Robert et al. | 701/16 |
| 6,983,206 B2 * | 1/2006 | Conner et al. | 701/301 |
| 7,109,889 B2 * | 9/2006 | He | 340/971 |
| 7,117,089 B2 * | 10/2006 | Khatwa et al. | 701/301 |
| 7,132,960 B2 * | 11/2006 | Glover | 340/945 |
| 7,133,771 B1 * | 11/2006 | Nesbitt | 701/202 |
| 7,206,698 B2 * | 4/2007 | Conner et al. | 701/301 |
| RE39,618 E * | 5/2007 | Levine | 701/29 |
| 7,230,632 B2 * | 6/2007 | Coldefy et al. | 345/619 |
| 7,302,318 B2 * | 11/2007 | Gerrity et al. | 701/16 |
| 7,342,514 B1 * | 3/2008 | Bailey et al. | 340/961 |
| 7,363,145 B2 * | 4/2008 | Conner et al. | 701/120 |
| 7,403,132 B2 * | 7/2008 | Khatwa | 340/970 |
| 7,567,187 B2 * | 7/2009 | Ramaiah et al. | 340/945 |
| 7,587,278 B2 * | 9/2009 | Poe et al. | 701/301 |
| 7,620,494 B1 * | 11/2009 | Matthews et al. | 701/211 |
| 7,640,082 B2 * | 12/2009 | Dwyer | 701/3 |
| 7,693,621 B1 * | 4/2010 | Chamas | 701/16 |
| 7,706,971 B2 * | 4/2010 | Jaugilas et al. | 701/208 |
| 7,710,261 B2 * | 5/2010 | Fetzmann et al. | 340/539.11 |
| RE41,396 E * | 6/2010 | Clark et al. | 701/120 |
| 7,755,516 B2 * | 7/2010 | Clark et al. | 340/961 |
| 7,756,637 B2 * | 7/2010 | Wipplinger et al. | 701/211 |
| 7,765,037 B2 * | 7/2010 | Bagge et al. | 701/16 |
| 7,868,813 B2 * | 1/2011 | O'Flynn et al. | 342/36 |
| 2002/0140810 A1 * | 10/2002 | Winikka | 348/117 |
| 2003/0045994 A1 * | 3/2003 | Stratton et al. | 701/120 |
| 2003/0102987 A1 * | 6/2003 | Walter | 340/972 |
| 2003/0139877 A1 * | 7/2003 | Dwyer | 701/206 |
| 2003/0182052 A1 * | 9/2003 | DeLorme et al. | 701/201 |
| 2004/0030465 A1 * | 2/2004 | Conner et al. | 701/16 |
| 2004/0160354 A1 * | 8/2004 | Coldefy et al. | 342/33 |
| 2004/0230351 A1 * | 11/2004 | Rumbo et al. | 701/3 |
| 2006/0022048 A1 * | 2/2006 | Johnson | 235/462.1 |
| 2006/0227014 A1 * | 10/2006 | Gannon | 340/972 |
| 2007/0260364 A1 * | 11/2007 | Dwyer | 701/3 |
| 2008/0106438 A1 * | 5/2008 | Clark et al. | 340/972 |
| 2008/0147320 A1 * | 6/2008 | Burch | 701/211 |
| 2008/0234882 A1 * | 9/2008 | Villaume et al. | 701/9 |
| 2009/0009363 A1 * | 1/2009 | Orf et al. | 340/973 |
| 2009/0045982 A1 * | 2/2009 | Caillaud et al. | 340/972 |
| 2009/0055093 A1 * | 2/2009 | Hamilton et al. | 701/209 |
| 2009/0112464 A1 * | 4/2009 | Belcher | 701/210 |
| 2009/0291418 A1 * | 11/2009 | Srivastav et al. | 434/43 |

* cited by examiner

SYSTEM AND METHOD FOR DISPLAYING GRAPHICAL DEPARTURE PROCEDURES

TECHNICAL FIELD

Embodiments of the subject matter described herein relate generally to graphical display of aircraft information. More particularly, embodiments of the subject matter relate to display of departure procedures for an aircraft.

BACKGROUND

Each runway at an airport positions an aircraft for take-off and departing flight in a fixed direction. Runways are typically surrounded by an area of clearance so that an aircraft can begin its ascent without encountering such obstacles as buildings, trees, power lines or their support structures, and so on. Preferably, the clear airspace extends well away from the departure end of the runway, permitting ease of flight.

Airports can sometimes be positioned in areas where extensive clearance is not possible for a variety of reasons. For example, natural features, such as trees or hills can be present. Similarly, artificial obstacles, including housing, buildings, fences, utility structures, can be present due to proximity to a nearby population center serviced by the airport. Accordingly, various obstacles can be present near the runway, and such obstacles must be avoided by departing aircraft.

A survey of the obstacles present near the departure end of a runway, called a departure procedure, is often provided to aircraft operators to apprise them of the obstacles. Such information is typically a dense, repetitive list, which is intrinsically difficult for an operator to commit to memory. Additionally, a pilot may depart from a large number of different runways. Thus, the use of multiple runways can further augment the difficulty of using operator memory to recall mentally cumbersome strings of information for distinctly different runways. While sometimes a departure procedure is provided to an aircraft operator in written form, the obstacle information remains as a dense list of strings of information. Thus, even under normal circumstances, it can be time consuming for an operator to refer to and interpret the departure procedure during aircraft operation.

BRIEF SUMMARY

A method of visually presenting aviation obstacles to an operator of an aircraft is disclosed. The method comprises receiving departure information associated with a runway having a departure end, parsing the departure information to determine a presence of an obstacle associated with the runway, determining a location of the obstacle relative to the departure end of the runway, and displaying a graphical representation of the runway and a graphical representation of the obstacle in the location relative to the departure end of the runway.

A method of displaying a departure procedure for an aircraft departing from a runway having a departure end is also disclosed. The method comprises receiving departure information associated with the runway, parsing the departure information to determine a geographic location of the runway, parsing the departure information to determine a presence of an obstacle associated with the runway and a position of the obstacle relative to the departure end of the runway, and displaying a graphical representation of the runway and a graphical representation of the obstacle at the position relative to the departure end of the runway.

A system for graphically displaying departure information for an aircraft departing from a runway having a departure end is also disclosed. The system comprises a display device adapted to present a graphical representation of a departure procedure for the aircraft, a storage device adapted to store the departure procedure, and a system controller coupled to the display device and to the storage device and adapted to receive the departure procedure and to parse the departure procedure to extract obstacle information from the departure procedure, the system controller further adapted to determine, from the obstacle information, a first position of an obstacle relative to the departure end of the runway and to operate the display device to present a graphical representation of the obstacle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. In practice, one or more processor devices can carry out the described operations, tasks, and functions, as well as other processing of signals. The memory locations where data bits are maintained are physical locations that have particular electrical, magnetic, optical, or organic properties corresponding to the data bits.

It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 1:
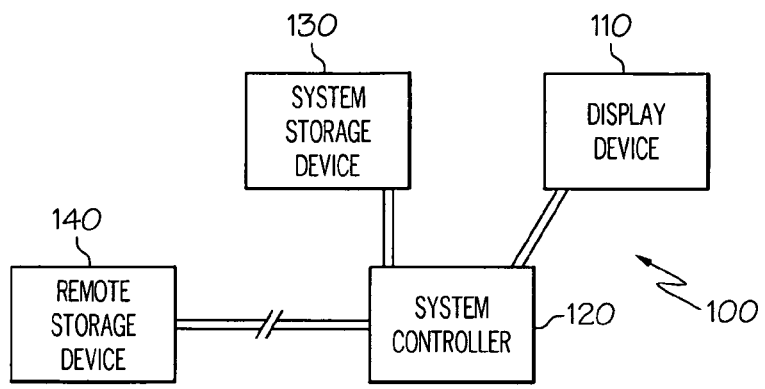
FIG. 1 is a schematic diagram of an embodiment of a departure procedure display system.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter. Such a coupling can be detachable or permanent, depending on the embodiment.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear," "side", "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

For the sake of brevity, conventional techniques related to data transmission, including between different computer systems, textual parsing, graphical display, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

FIG. 1 illustrates an exemplary embodiment of a departure procedure display system 100. Preferably, the system 100 is embodied within an aircraft, either as a standalone unit or a subcomponent of another system of the aircraft. The system 100 comprises a display device 110, a system controller 120, and a system storage device 130. In certain embodiments, the system controller 120 can be coupled to a remote storage device 140, as explained in greater detail below. Prior to, or during, departure of the aircraft from a runway, the system controller 120 can receive a departure procedure, parse it to extract information regarding obstacles associated with a runway, and display graphical representations of the obstacles to assist the operator in directing the aircraft.

The display device 110 can be any graphical display unit, such as a CRT display, an LCD device, an Organic Light-Emitting Diode (OLED) display, and the like. Preferably, the display device 110 is configured to display graphical images to an operator of the aircraft. The size, resolution, and other attributes of the display device 110 can vary in different embodiments while still performing the required functions.

The display device 110 can be one that displays, under control of the system controller 120, a chart or map of the region in which the aircraft is operating. In some embodiments, the display device 110 can adjust the displayed images as the aircraft travels. If the aircraft is maintained at a fixed position, the resulting movement of the map around the aircraft is a moving map. The moving map advantageously constantly displays the region surrounding the aircraft, thereby presenting information relevant to the location of the aircraft to the operator(s).

The display device 110 is also preferably capable of performing other functions as well, including some embodiments where a touchscreen device is used. Thus, the display device 110 can operate solely to present information to an operator, or can receive input, and relay the input to the system controller 120. The display device 110 can be operated by other systems and/or controllers of the aircraft, and can be operated to display a variety of information, such as aircraft status, as desired.

The system storage device 130 is preferably a digital storage medium of an appropriate type, such as an electronic circuit, a semiconductor memory device, a ROM, a flash memory, an erasable ROM (EROM), a floppy diskette, a CD-ROM, an optical disk, a hard disk, or a fiber optic medium. The system storage device 130 can be a separate device, as shown, or can be integrally formed with one or more of the other components of the system 100. The system storage device 130 preferably contains departure procedures associated with runways, including obstacle information, in a standard format, as described below. In certain embodiments, the system storage device 130 can contain other information, and interoperate with other components of the aircraft.

The remote storage device 140 can be of any type similar to the system storage device 130, except that it is a component of a remote computer system. Thus, for descriptive purposes, one example can be a computer system operated by an airport at which the aircraft is present prior to departure. The remote storage device 140 need not be a singular storage device and can represent any system, device, or component to which the system controller 120 can be coupled to interoperate with, as described in more detail below. Thus, the remote storage device 140 can be a component of an airport computer system with which information is exchanged from the aircraft. Thus, the remote storage device 140 need not be a physical device to which the system controller 120 is coupled, but represents a remote data source from which information can be exchanged with the system controller 120.

The system controller 120 can operate the display device, as well as retrieve and process information from the system storage device 130. The system controller 120, though illustrated as a single unit, can comprise multiple subcomponents interoperating to perform at least the functions described. For example, the system controller 120 preferably comprises a microprocessor, a memory device, and a data bus coupling them, although other components, such as networking devices, input/output devices and connections, and the like can also be present in certain embodiments. The system controller 120 can be modular, or integrated with other systems of the aircraft. In certain embodiments, the system controller 120 can be integrated with various other components of the system 100, such as the display device 110, although shown as separate devices in FIG. 1 for descriptive purposes.

The system controller 120 preferably is coupled to the display device 110, and is adapted to operate the display device 110 to produce the desired imagery. For example, in certain embodiments, the system controller 120 can present information regarding the aircraft on the display device 110. In some embodiments, the moving map shown on the display device 110 can be the result of operation by the system controller 120, including adjustments made to produce the scrolling or moving features of the map. Certain aspects of the map, including graphic representation of obstacles, can also be the result of operation by the system controller 120. The system controller 120 can perform other operations in the aircraft, as appropriate to the embodiment.

Figure 2:
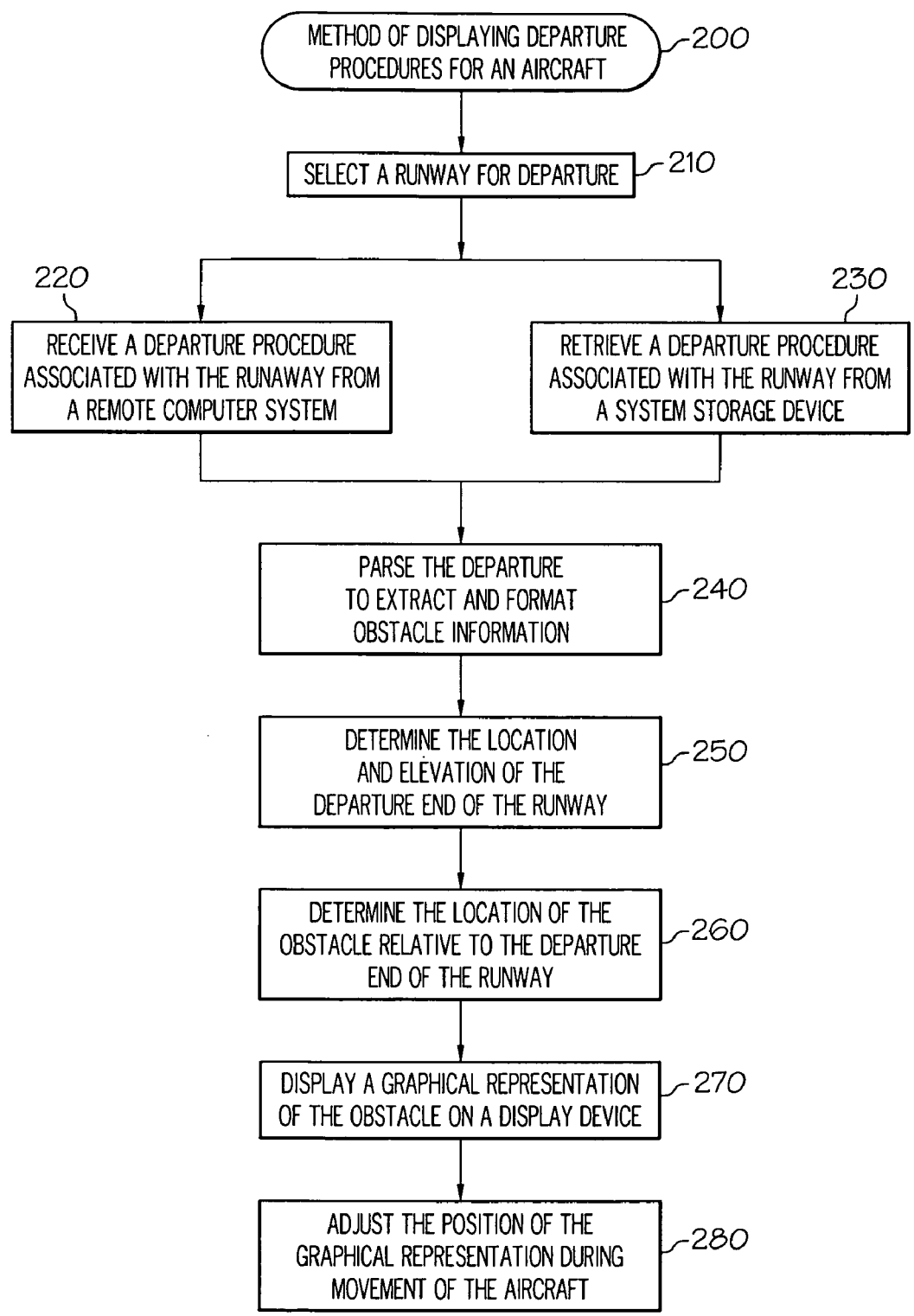
FIG. 2 is a flowchart illustrating an embodiment of a method of displaying a departure procedure.

FIG. 2 illustrates a method 200 of displaying a departure procedure for an aircraft to an operator using the system 100 described above with reference to FIG. 1. The various tasks performed in connection with method 200 may be performed by software, hardware, firmware, or any combination thereof. For illustrative purposes, the following description of method 200 may refer to elements or exemplary illustrations mentioned above in connection with FIG. 1, or in subsequent FIGS. 3 and 4. In practice, portions of method 200 can be performed by different elements of the described system, e.g., the display device 110, the system storage device 130, or the system controller 120. It should be appreciated that method 200 may include any number of additional or alternative tasks, the tasks shown in FIG. 2 need not be performed in the illustrated order, and method 200 may be incorporated into a more comprehensive procedure or process having additional functionality not described in detail herein.

During operation of the system 100, departure information is graphically displayed on the display device 110 by the system controller 120, eliminating the need for the aircraft operator to memorize or read through dense lines of information during takeoff, including during emergency events. Departure procedures contain information specific to a runway for use during takeoff by an aircraft. Thus, for each departing aircraft, the operator reviews departure procedures and is apprised of conditions and/or features of the runway and the surrounding area that are relevant to flight operations.

Accordingly, an aircraft's operator first selects a runway from which the aircraft will depart (task 210). Selecting a runway can be a subsequent step after selecting an appropriate airport. In certain embodiments, the system 100 can include a positioning device, which can determine the geographical position of the aircraft and can present a list of runways likely to be used by the aircraft for the operator to choose from. In certain embodiments, the selection (task 210) can be provided from the remote storage device 140, removing the need for the operator to manually select a runway.

Subsequent to runway selection (task 210), the system controller 120 can receive (task 220) or retrieve (task 230) departure information, including departure procedures. In the event that departure procedures are to be used from the remote storage device 140, the system controller 120 can retrieve (task 230) the departure information using the coupling with the remote storage device 140. Alternatively, if the departure information is stored in the system storage device 130, it can be retrieved (task 230).

After the system controller 120 has obtained the departure information, they can be parsed to extract obstacle information (task 240). Preferably, the departure information is stored in a standard format, and received by the system controller 120 in that format. Subsequently, when parsing the information, the system controller 120 can examine the departure information to identify certain strings of information. After identifying the information, the system controller can isolate the obstacle data and reformat it.

Figure 3:
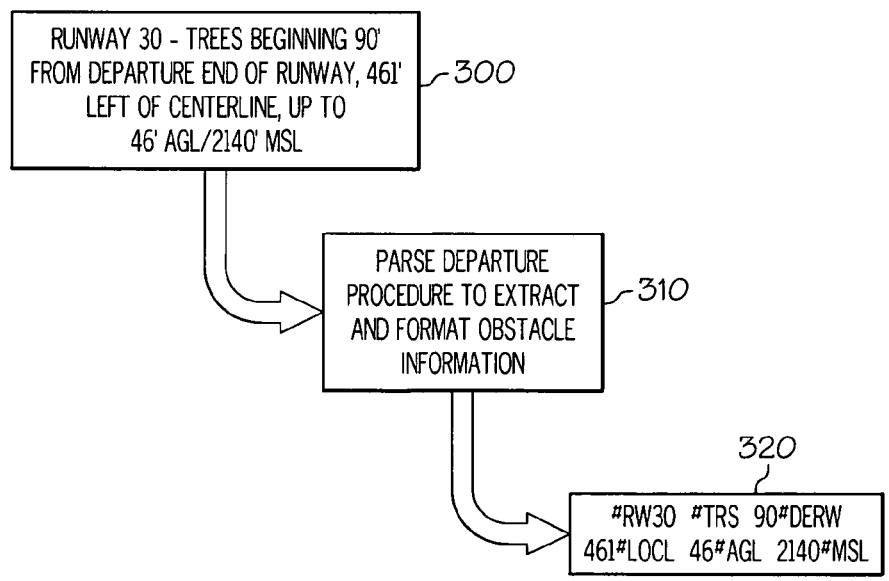
FIG. 3 is a schematic representation of an exemplary process for parsing a departure procedure.

One example of parsing departure information to extract and reformat obstacle information is shown in FIG. 3. As mentioned, departure procedures can be presented in a standard format and using standard acronyms and definitions, which advantageously simplifies use among different operators. Departure procedure 300 is representative of a standard-formatted departure procedure conveying information regarding one obstacle, and is taken from the sample departure information recited below. "AGL" indicates a height "Above Ground Level" and "MSL" indicates a measurement above "Mean Sea Level." Thus, AGL is a relative height, while MSL is an absolute one.

Typically, multiple departure procedure lines are collected to convey information regarding all relevant obstacles for an aircraft departing from a particular runway. An example of departure procedures related to one airport, including runways numbered twelve and thirty are presented below for appreciation of the difficulty in deriving useful information, including committing it to memory:

DEPARTURE PROCEDURE: Rwy 12, climbing right turn direct PSK VORTAC to 3500 before proceeding on course. Rwy 30, climbing left turn direct PSK VORTAC to 4100 before proceeding on course.

NOTE: Rwy 12, bushes and trees beginning 275' from departure end of runway, 154' left of centerline, up to 100' AGL/2239' MSL. Trees beginning 5108' from departure end of runway, 1363' left of centerline, up to 100' AGL/2499' MSL. Trees beginning 3165' from departure end of runway, 1324' right of centerline up to 100' AGL/2279' MSL. Rwy 30, trees beginning 90' from departure end of runway, 461' left of centerline, up to 46' AGL/2140' MSL. Fence and obstruction light pole beginning 546' from departure end of runway, 161' left of centerline, up to 12' AGL/2139' MSL. Vehicle on road beginning 567' from departure end of runway, 310' left of centerline, 24' AGL/2137' MSL. Trees beginning 2080' from departure end of runway, 788' left of centerline, up to 100' AGL/2201' MSL. Fence, 861' from departure end of runway, 52' right of centerline, up to 12' AGL/2135' MSL. Trees beginning 539' from departure end of runway, 326' right of centerline, up to 40' AGL/2153' MSL. Trees beginning 1328' from departure end of runway, 117' right of centerline, up to 100' AGL/2182' MSL. Terrain beginning 330' from departure end of runway, 366' right of centerline, up to 2138' MSL.

As can be seen, even a handful of obstacles can result in a dense, difficult-to-read presentation to the aircraft operator. For example, a repetitive listing of numbers can be challenging for a reader to rapidly absorb or recall. As shown, each sentence describing an obstacle consists of multiple numerical references, including distance, position relative to runway centerline, height of the obstacle, and so on, including references to acronyms. Additionally, multiple obstacles per runway are presented sequentially, without visual aids or other aspects of data presentation which can enhance retention. Difficulty for the operator in recalling obstacle information can be amplified during stressful situations.

The system controller 120 can examine the departure information to extract strings of useful obstacle data and reformat it. The departure procedure 300 is parsed (step 310) by the system controller 120 to extract a concisely format the obstacle data as the reformatted departure procedure 320. Reformatted departure procedure 320 can be in any format useful for future display. Although the precise formatting can change between embodiments, preferably the system controller 120 identifies an obstacle in the departure procedure 300, identifies attributes associated with the obstacle, and reformats the information regarding the obstacle into a useful format. Thus, the use of the number sign (#) to indicate certain information is arbitrary, and other identifiers or flags can be used, as well as the order of information changed as well.

In the present example, "trees" can be identified by the system controller 120 as an obstacle. The location of the obstacle relative to the departure end of the runway the aircraft will use is also contained in the departure information. Specifically, the trees are located "90' from departure end of runway," "461' left of centerline" of the departure end of the runway, and have a height, "up to 46'" AGL or 2140' above MSL.

The reformatted departure procedure 320 contains strings expressing the same information in a more concise format, suitable for later graphical display. For example, "trees" has been contracted to "#TRS" while "90' from departure end of runway" has been reformatted as "90#DERW". Similarly, "Runway 30" has been changed to "#RW30", "461' left of centerline" has been changed to "461#LOCL", the height indicated as "46' AGL/2140 MSL" has been formatted to "46#AGL 2140#MSL". Although one example of reformatting is used, other new formats can also be used.

The aircraft can be equipped with one or more geographic positioning systems, such as a Global Positioning System (GPS) receiver, or it can identify its geographic position using external references, such as the airport or runway, including the departure end of the runway (task 250). Determination of the location of the runway and departure end of the runway can include determining the elevation above mean sea level. Such information can include the bearing of the runway. Accordingly, it is possible for the system controller 120 to determine the geographic position, such as a longitudinal and/or latitudinal position, of the runway, departure end of the runway, and/or obstacle. Additionally, the position of the obstacle relative to the departure end of the runway can be determined (task 260). Typically such information is contained within the departure procedure, as shown above. In certain embodiments, the departure procedure can contain geographical positioning information for the obstacle, which can be parsed and formatted for later use.

In certain embodiments, the system storage device 130 can retain standard-formatted departure procedures, reformatted departure and/or obstacle information, or both. Thus, in certain circumstances, standard-formatted departure procedures can be retrieved by the system controller 120 and presented to the operator or, if desired, the reformatted obstacle information can be retrieved and the display device 110 appropriately operated to display a graphical representation, as described. The remote storage device 140 can similarly store either or both formats of departure and/or obstacle information.

Following determination of the location of the runway, the departure end of the runway, and the obstacle, either geographical or relative to one another, the obstacle can be displayed as a graphical representation on the display device 110 (task 270). The system controller 120 preferably operates the display device 110 to display the obstacle as a graphical representation. Such a graphical representation can include icons associated with the particular obstacle, such as a stylized tree image for a tree-related obstacle, or it can be textual, such as the word "tree," or any other suitable representation. Some graphical representations can be selected from standard iconography for maps or aviation charts, as desired.

Figure 4:
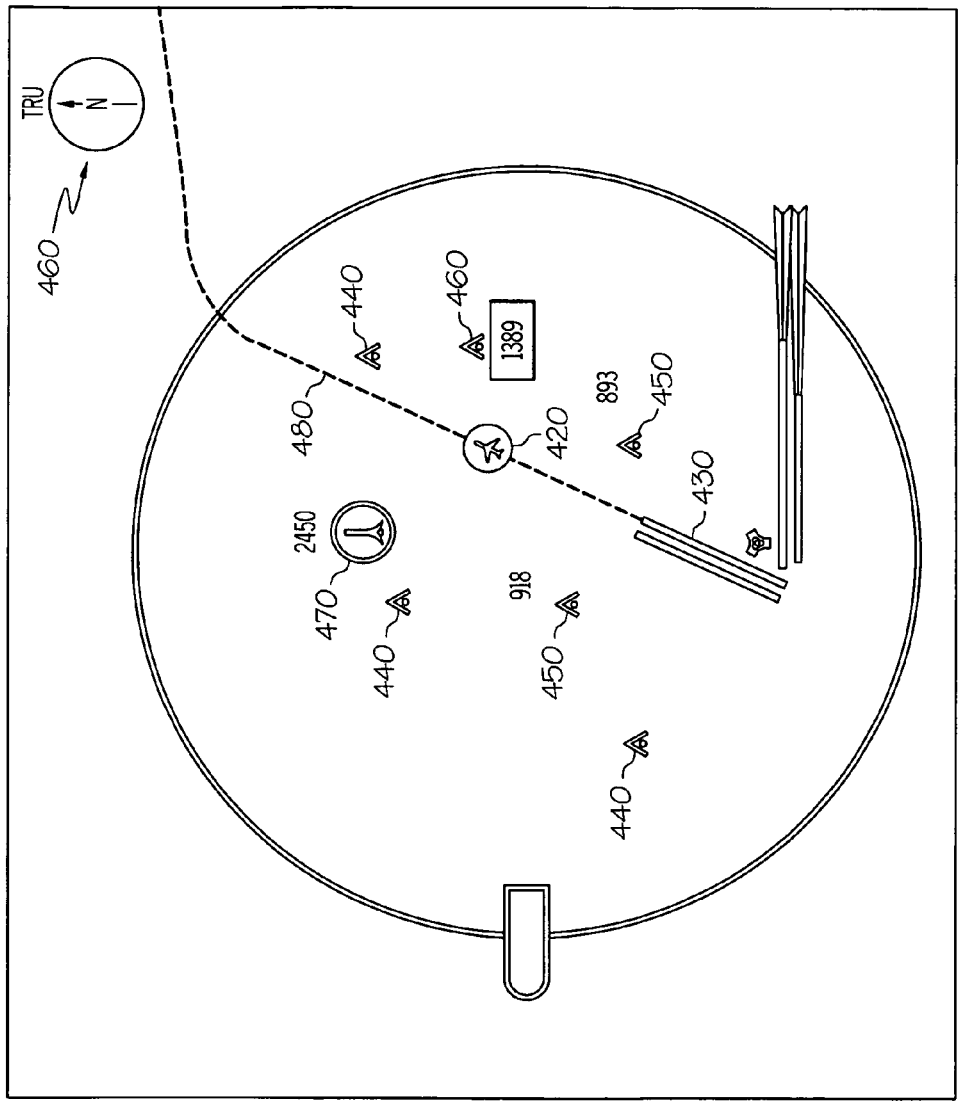
FIG. 4 depicts a graphical representation of a departure procedure.

FIG. 4 illustrates one embodiment of graphical imagery from a display device 110. Although the embodiment shown is a screen from a moving map, other displays can also be used, including perspective views which display obstacles in a depth field derived from the position of each obstacle. Other types of displays are also possible, including a static map, a three-dimensional representation, and so on. The displayed screen 400 is a map with an orientation icon 410. The aircraft 420 is identified as an icon with a circle, though any suitable graphical representation can be used. A departure runway 430 is also preferably displayed with a representation.

Various obstacles 440 are shown without an associated height. Some obstacles 450 are shown with a height. As can be seen, obstacle 460 has a boxed height value, which can be used for some obstacles, such as those over a certain height, or for those in the path of travel of the aircraft, or other circumstances, as appropriate to the embodiment. The preferred form of graphical representation can vary between embodiments, and can be adjusted as desired by the operator, through input to the system controller 120. Obstacle 470 is of a different obstacle representation, indicating a height above a predefined amount. The predefined amount can vary between embodiments or even between runways, if desired, depending on takeoff conditions. Where the runway, departure end of the runway, and/or obstacle are determined using a geographic position, the positions of the displayed representations of the item can correspond to a geographic position on the map. For example, the runway can be shown at its geographic position, while the obstacle can be shown at a position determined either relative to the runway's position or by the geographic position of the obstacle obtained previously.

Travel line 480 indicates a proposed course of travel for the aircraft. The travel line 480 can be received with departure information, or can be determined by the system controller 120 after parsing and identifying obstacles near the departure end of the runway.

Additionally, the system controller 120 can operate the display device 110 to adjust the displayed map or chart as the aircraft travels (task 290). Thus, the graphical representations of obstacles can be displayed on a moving map. The graphical representations also can be adjusted as the aircraft travels, such as by augmenting a displayed representation with additional information as the aircraft nears the obstacle with which the representation is associated, or diminishing the representation as the aircraft travels past the obstacle.

In certain embodiments where the display device is embodied as a touchscreen device, the display device can be adapted to detect input from the operator and respond with additional information or modes of operation. For example, if an operator contacts the touchscreen at or near a graphical representation of an obstacle, the system controller 120, upon receiving input from the operator can operate the display device 110 to present detailed or additional information regarding the obstacle with which the graphical representation is associated.

Thus, if an operator touches an icon indicating the trees from FIG. 3, the display device 110 can provide notice to the system controller of the event. The system controller can then operate the display device to adjust the displayed imagery to include, for example, a height associated with the trees, such as 46' AGL, or 2140' MSL. Repeatedly touching the representation of the trees can cycle through different detailed information, such as the geographical location, position relative to the departure end of the runway, an identifier indicating that the obstacle is, in fact, trees, and so on. In some embodiments, the additional or detailed information can be canceled by contacting a different part of the touchscreen. In certain embodiments, one mode through which the system can cycle can be the default presentation.

In certain embodiments, the display device 110, embodied as a touchscreen or with other input features, can be used to present information to the system 100. One example can be during selection of a runway (task 210). An operator can use the display device 110 to provide information regarding which runway the aircraft will use for takeoff for the purpose of retrieving the appropriate departure procedures (tasks 220, 230).

Additionally, the method can also be applied to approach ends of runways in a similar fashion. Instead of retrieving departure procedures, the system controller 120 can receive, parse, and operate the display device 110 to display obstacles related to the approach end of a runway.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of visually presenting aviation obstacles to an operator of an aircraft, the method comprising
   receiving a departure procedure narrative associated with a runway having a departure end;
   parsing the departure procedure narrative to determine a presence of an obstacle associated with the runway;
   determining a location of the obstacle relative to the departure end of the runway from the parsed departure procedure narrative; and
   displaying a graphical representation of the runway and a graphical representation of the obstacle based on the determined location relative to the departure end of the runway.

2. The method of claim 1, further comprising:
   determining a location of the aircraft relative to the departure end of the runway and
   displaying a graphical representation of the aircraft relative to the departure end of the runway.

3. The method of claim 1, wherein receiving the departure procedure narrative comprises receiving information from a remote computer system.

4. The method of claim 1, wherein parsing the departure procedure narrative comprises extracting obstacle information.

5. The method of claim 4, wherein determining the location of the obstacle comprises determining a geographical location of the departure end of the runway.

6. The method of claim 5, wherein determining the geographical location of the departure end of the runway comprises parsing the departure procedure narrative to extract runway information.

7. The method of claim 4, wherein displaying the graphical representation comprises selecting an icon associated with the obstacle in response to the obstacle information.

8. The method of claim 7, wherein displaying the graphical representation comprises displaying numerical information associated with the obstacle.

9. The method of claim 8, wherein displaying the graphical representation comprises displaying the icon and numerical information on a moving map.

10. The method of claim 9, wherein displaying the graphical representation comprises adjusting a position of the icon and a value of the numerical information during movement of the moving map.

11. A method of displaying a departure procedure for an aircraft departing from a runway having a departure end, the method comprising:
    receiving a departure procedure narrative associated with the runway;
    parsing the departure procedure narrative to determine a geographic location of the runway;
    parsing the departure procedure narrative to determine a presence of an obstacle associated with the runway and a position of the obstacle relative to the departure end of the runway; and
    displaying a graphical representation of the runway and a graphical representation of the obstacle based on the determined presence and the determined position relative to the departure end of the runway.

12. The method of claim 11, wherein determining the geographical location of the runway comprises determining a bearing, a first longitudinal position and a first latitudinal position, the first longitudinal and latitudinal positions corresponding to the departure end.

13. The method of claim 12, wherein determining the position of the obstacle comprises determining a second longitudinal position and a second latitudinal position associated with the obstacle.

14. The method of claim 13, wherein displaying the obstacle comprises displaying the obstacle on a moving map at a first position corresponding to the second longitudinal and latitudinal positions.

15. The method of claim 11, wherein determining the position of the obstacle further comprises determining a height associated with the obstacle.

16. The method of claim 15, wherein displaying the obstacle further comprises displaying the height associated with the obstacle.

17. The method of claim 11, further comprising determining a proposed travel course from the departure procedure narrative.

18. The method of claim 17, further comprising displaying the proposed travel course with the graphical representation of the obstacle.

19. A system for graphically displaying departure information for an aircraft departing from a runway having a departure end, the system comprising:
    a display device adapted to present a graphical representation of a departure procedure narrative for the aircraft;
    a storage device adapted to store the departure procedure narrative; and
    a system controller coupled to the display device and to the storage device and adapted to receive the departure procedure narrative and to parse the departure procedure narrative to extract obstacle information from the departure procedure narrative, the system controller further adapted to determine, from the obstacle information, a first position of an obstacle relative to the departure end of the runway and to operate the display device to present a graphical representation of the obstacle based on the determined first position.

20. The system of claim 19, wherein the system controller is further adapted to operate the display device to present the graphical representation of the obstacle on a moving map.

* * * * *